United States Patent [19]

Stark, Jr.

[11] 3,891,891

[45] June 24, 1975

[54] HIGH VOLTAGE PROTECTION CIRCUIT

[75] Inventor: John Stark, Jr., Indianapolis, Ind.

[73] Assignee: RCA Corporation, New York, N.Y.

[22] Filed: Jan. 31, 1974

[21] Appl. No.: 438,324

[52] U.S. Cl. .................................. 315/379; 315/381
[51] Int. Cl. ........................................... H01j 29/70
[58] Field of Search ......... 315/27 TD, 20, 27 R, 28, 315/29, 25, 26

[56] References Cited

UNITED STATES PATENTS

| | | | |
|---|---|---|---|
| 2,997,622 | 8/1961 | Claypool | 315/29 |
| 3,629,644 | 12/1971 | Waybright | 315/29 |
| 3,767,960 | 10/1973 | Ahrens | 315/27 TD |

*Primary Examiner*—Maynard R. Wilbur
*Assistant Examiner*—J. M. Potenza
*Attorney, Agent, or Firm*—Eugene M. Whitacre; Paul J. Rasmussen

[57] ABSTRACT

A zener diode rectifies an alternating current voltage representative of the generated high voltage in a television deflection system. This rectified voltage is supplied to a control electrode of a controlled current conducting device in the television receiver, the operation of the device being essential to the generation of a viewable raster. Additionally, the zener diode regulates the voltage supplied to the control electrode thereby limiting the high voltage generated in the deflection system to a value determined by the voltage rectified by the zener. In the event that excessive voltage causes excessive reverse current to flow in the zener diode, the zener diode will open- or short-circuit thereby altering the conduction of the controlled current conducting device, substantially impairing the device's ability to produce a viewable raster.

10 Claims, 1 Drawing Figure

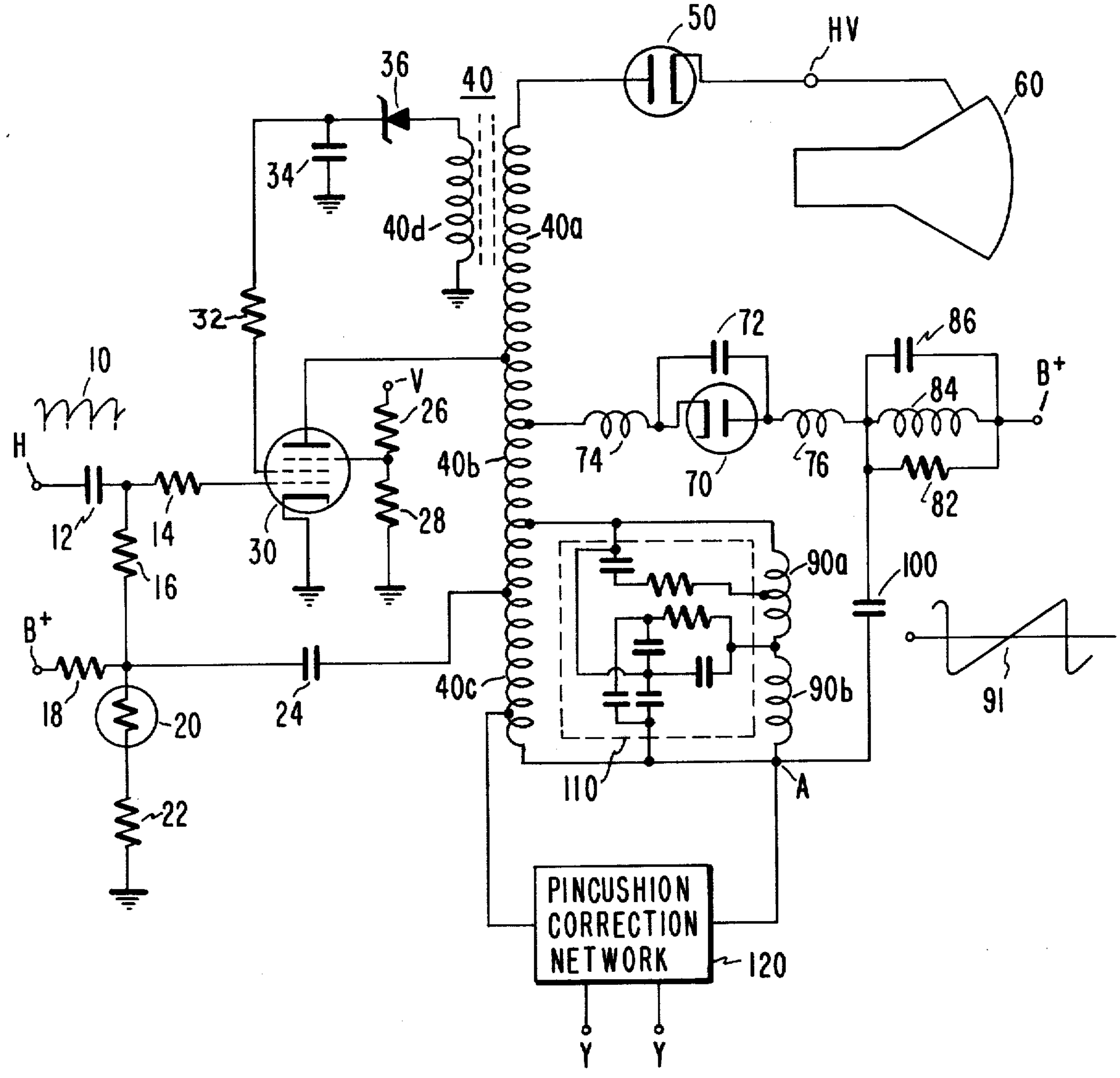
10
H
12
14
16
B+
18
20
22
24
30
32
34
36
40
40a
40b
40c
40d
50
HV
60
V
26
28
70
72
74
76
84
86
82
B+
90a
90b
100
91
110
A
PINCUSHION CORRECTION NETWORK
120
Y
Y

HIGH VOLTAGE PROTECTION CIRCUIT

BACKGROUND OF THE INVENTION

This invention relates to high voltage protection systems for preventing the generation of excessive high voltage for a kinescope.

Most modern television receivers produce high voltage necessary for the anode voltage of the picture tube from a winding of the horizontal output transformer. Some high voltage generating systems have the propensity to develop excessively high voltage under certain conditions such as high line voltage.

Excessively high generated voltage may under certain circumstances lead to component failures and in some instances to the emission from the receiver of potentially harmful X-radiation. In recognition of this fact, manufacturers generally include in their receivers means for monitoring the high voltage generating systems and for controlling the magnitude of the generated high voltage.

Such protection systems generally feed back to the high voltage generating system signals representative of the magnitude of the generated high voltage and render the kinescope display unviewable when the generated high voltage becomes high enough to make X-ray emissions or component damage a likelihood.

A significant problem inherent in many such systems, however, is that they may be removed from the receiver or bypassed in the receiver without affecting normal receiver operation. In such a situation when excessive high voltage is generated, such systems either fail to function by virtue of the fact that they have been removed from circuit, or function but fail to affect receiver operation under abnormal high voltage conditions because they have been bypassed. Similarly, many such systems may experience component failure themselves and cease to function effectively to control the magnitude of generated high voltage or to provide a warning when excessively high voltage is being generated by the receiver.

A system is desired which would control the magnitude of generated high voltage under normal conditions but which would provide the necessary warning of high voltage generator malfunction by disrupting the viewable display when excessive high voltage is being generated. Additionally, the receiver would not produce a viewable display if the system were bypassed in the receiver or removed from the receiver. The system should also protect against damage to the receiver of X-ray emissions due to its own malfunction by rendering the receiver display unviewable in the event of a system malfunction.

SUMMARY OF THE INVENTION

In accordance with the invention, a high voltage protection system for controlling a generated high voltage supplied to a kinescope includes means for producing a viewable display on the kinescope including a controlled current conducting device having at least a first control electrode. Means are coupled to the means for producing a viewable display for having alternating current voltage variations excited therein in response to the conduction of the controlled current conducting device, the voltage variations determining the generated high voltage. Means are provided which include a device for rectifying and regulating voltage and filtering and storage means coupled to the means for having voltage variations excited therein and to the first control electrode of the controlled current conducting device. These means serve to derive alternating current voltage from the means for having voltage variations excited therein and for rectifying that alternating current voltage and for filtering and storing the resulting rectified voltage for providing direct current voltage to the first control electrode, the rectifying and regulating device conducting in a reverse direction when the difference between the stored voltage and the alternating current voltage exceeds a predetermined value for regulating the direct current voltage supplied to the control electrode of the controlled current device for controlling the generated high voltage.

The FIGURE is a partly block and partly schematic diagram of a circuit embodying the invention.

DESCRIPTION OF THE PREFERRED EMBODIMENT

In the preferred embodiment illustrated in the FIGURE, a horizontal oscillator output waveform 10 at terminal H is coupled through a coupling capacitor 12 and a parasitic oscillation suppressing resistor 14 to the control grid of a horizontal deflection output amplifier tube 30. The cathode of tube 30 is coupled to ground. Its screen grid is coupled through a second parasitic oscillation suppressing resistor 32 to one terminal of a storage capacitor 34, the other terminal of which is coupled to ground.

The junction of resistor 32 and capacitor 34 is coupled to the cathode of a rectifying and regulating zener diode 36. The anode of zener diode 36 is coupled to one terminal of a winding **40*d* of a horizontal output transformer 40. The remaining terminal of winding 40*d*** is coupled to ground.

The suppressor grid of tube 30 is coupled to a voltage divider network comprising a resistor 26 and a resistor 28 in series between a voltage supply V and ground. This network supplies the suppressor grid voltage for tube 30.

The plate electrode of tube 30 is coupled to the junction of a high voltage winding **40*a* and a winding 40*b* of horizontal output transformer 40. The remaining terminal of winding 40*a* is coupled to the anode of a high voltage rectifier tube 50, the cathode of which is coupled at terminal HV to a kinescope 60** for supplying high voltage thereto.

The remaining terminal of winding **40*b* is coupled to one terminal of a winding 40*c* of horizontal output transformer 40. It is across winding 40*c* that horizontal deflection winding portions 90*a* and 90*b*** are serially coupled.

A tap on winding **40*b* is coupled through a radiation suppressing coil 74 to the cathode of a damper diode tube 70 and to one terminal of a radiation suppressing capacitor 72. The remaining terminal of capacitor 72 is coupled to the anode of damper tube 70 and serves to provide a bypass for radiation-producing high frequency switching transients around damper tube 70. Another radiation suppressing coil 76 is coupled to the anode of damper tube 70. Coils 74 and 76 present high impedance to high frequency switching transients generated in damper tube 70.**

The remaining terminal of coil 76 is coupled to a horizontal efficiency circuit comprising a horizontal efficiency coil 84, a tuning capacitor 86 and a resistor 82 in a parallel configuration. The horizontal efficiency circuit serves to decrease the plate voltage on horizontal output tube 30 prior to the end of the horizontal deflection trace interval when tube 30 is conducting maximum current thereby decreasing power dissipation in the horizontal output stage and increasing its efficiency. Additionally, the efficiency circuit serves to shape the voltage waveform across winding 40*c* and deflection windings 90*a* and 90*b* to assist in achieving linearity in current waveform 91 through windings 90*a* and 90*b* during the trace interval.

The remaining terminal of the horizontal efficiency circuit is coupled to a direct current operating voltage supply B+. The coupled terminals of radiation suppression coil 76 and the horizontal efficiency circuit comprising elements 82, 84, and 86 are also coupled to the negative terminal of a B+ boost capacitor 100, the positive terminal of which is coupled to horizontal output transformer 40 through a terminal A of winding 40*c*. This coupling permits capacitor 100 to supply boosted B+ direct current operating voltage to the horizontal deflection output amplifier through winding 40*c* during normal operation of the horizontal deflection output stage.

A spurious yoke ringing damping circuit 110 is coupled to horizontal deflection windings 90*a* and 90*b*. This network suppresses undesirable high and low frequency ringing in the horizontal deflection windings. Additionally, a pincushion correction network 120 is coupled across a portion of winding section 40*c*. Typically, network 120 is a variable inductance which is varied at the vertical deflection rate by signals coupled from a vertical deflection system, not shown, through terminals Y—Y. Since windings 40*c* is the driving source for horizontal deflection windings 90*a* and 90*b*, pincushion correction network 120 acts to modulate the driving impedance of winding 40*c* at the vertical deflection rate.

A control grid biasing and voltage holddown circuit is coupled to the junction of capacitor 12 and resistor 14. Positive voltage is supplied from the B+ voltage supply through a resistor 18 and voltage pulses are coupled from winding 40*c* of horizontal output transformer 40 through a capacitor 24. The voltage established by coupling these two sources is coupled through a resistor 16 to the junction of capacitor 12 and resistor 14 and is also coupled to ground through a voltage dependent resistor 20 and a resistor 22 in series.

This network establishes a variable control grid bias voltage for tube 30 which adjusts the average value of input signal 10 to provide regulation of generated high voltage by feedback of signals representative of the high voltage pulse developed in winding 40*a* to the control grid of tube 30.

During the first portion of the trace interval, horizontal output tube 30 is cut off by the negative-going portion of input waveform 10. Current flow in horizontal deflection windings 90*a* and 90*b* and in winding 40*c* during the preceeding horizontal retrace interval has caused the cathode of damper diode 70 to become sufficiently negative with respect to its anode that current flows from the B+ supply through the horizontal efficiency circuit comprising elements 82, 84, and 86 and through winding 40*c* and horizontal deflection windings 90*a* and 90*b* to charge B+ boost capacitor 100 toward maximum boosted B+ voltage.

This current flow through the parallel combination of winding 40*c* and deflection windings 90*a* and 90*b* decays toward zero as the magnetic fields in these windings collapse. As the current in windings 40*c*, 90*a*, and 90*b* reaches the zero axis as shown by deflection current waveform 91, the charge on B+ boost capacitor 100 reaches a maximum and the electron beam reaches the horizontal center of the viewing screen of kinescope 60.

At this time, input voltage signal 10 at terminal H has gone positive sufficiently from its peak negative value to drive horizontal output tube 30 into conduction. During the remainder of the horizontal deflection trace interval, waveform 10 causes the conduction of tube 30 to increase in an approximately linear manner. As a result, the current in windings 40*c* and 90*a* and 90*b*, which has reached the zero current axis during the first half of the trace interval, crosses the zero axis as indicated by waveform 91 and begins to increase in an approximately linear fashion during the second half of the trace interval. During this interval, conduction through damper tube 70 has decreased to approximately zero and the deflection current is being supplied from the discharging of B+ boost capacitor 100 through windings 40*c*, 90*a*, 90*b*, and 40*b* and horizontal output tube 30.

At the end of the horizontal deflection trace interval, tube 30 is driven into cutoff by the negative-going spike of waveform 10. As tube 30 is driven into cutoff, the inductance of windings 40*c*, 90*a* and 90*b* and the capacitance associated with these windings undergo a half cycle of oscillation at a frequency approximately 2½ times the horizontal frequency. The energy stored in the magnetic fields of the windings is abruptly transferred into electric fields in the associated capacitance as the current in windings 40*c*, 90*a* and 90*b* decreases from a maximum in one direction and crosses the zero axis as waveform 91 indicates. The energy thus transferred to the capacitance is transferred back into the inductance of windings 40*c*, 90*a* and 90*b* causing a reversal of current in the windings. As the current through windings 40*c*, 90*a* and 90*b* reaches a maximum in the negative direction as shown by waveform 91, the cathode of damper tube 70 goes negative with respect to its anode once again and the retrace interval ends and the next succeeding trace interval begins.

During the retrace interval, the rapid switching into cutoff of horizontal output tube 30 causes a high voltage pulse to be generated at its plate electrode. This voltage pulse, which is due to the rapid change in current flow in winding 40*b*, is reflected into winding 40*a* where it is rectified in high voltage rectifier 50 to provide the high voltage necessary for the proper operation of kinescope 60.

This voltage pulse is also coupled to winding 40*d* where it is rectified by zener diode 36 and supplied to capacitor 34. The resulting positive voltage on the ungrounded terminal of capacitor 34 is coupled through current limiting resistor 32 to supply the screen grid voltage of horizontal output tube 30.

It is important to note that zener diode 36 may be used in this embodiment to perform both the rectifying and regulating functions because of the low power consumption of the screen grid. Zener diode 36 performs the rectifying function when the positive-going pulse coupled to winding 40*d* causes the anode of diode 36 to go positive with respect to the direct current voltage stored in capacitor 34. When the anode of zener diode 36 goes negative with respect to the stored voltage after the positive-going pulse has passed, zener diode 36 begins its regulating function, insuring that the voltage stored in capacitor 34 will not exceed the anode voltage of zener diode 36 by more than its reverse breakdown voltage.

Since the conductivity of horizontal output tube 30 is partially a function of its screen grid voltage, zener diode 36 provides control over the conduction of tube 30 by regulating the screen grid voltage. Since by controlling the conductivity of tube 30, the amplitude of the retrace voltage pulse may be controlled, zener diode 36 functions both as a rectifier for a direct current operating voltage supply and as a regulator to limit the generated voltage supplied to kinescope 60. The possibility of component damage or X-radiation due to excessive high voltage is thereby minimized.

Additionally, in the event that component failure elsewhere in the horizontal deflection system causes excessive high voltage to be generated for several horizontal deflection cycles causing continuing excessive reverse conduction by zener diode 36 as determined by the value of capacitor 34, that device will become short- or open-circuited. Short-circuiting of zener diode 36 due to excessive power dissipation results in removal of the direct current operating voltage from the screen grid of tube 30. This results in drastically reduced conduction by tube 30 which renders the display on kinescope 60 unviewable and reduces the generated high voltage at terminal HV. Open-circuiting of zener diode 36 yields the same result by preventing rectification of the voltage pulse generated across winding **40*d* thereby removing the direct current operating voltage supply from the screen grid, reducing the conduction of horizontal output tube 30**, rendering the raster unviewable and reducing the generated high voltage.

It should be noted that in certain tubes, a low direct current starting voltage must be supplied to the screen grid of the tube to initiate conduction. In embodiments of the inventive circuit utilizing such tubes a high resistance may be coupled directly from some direct current voltage source, for example B+, to the screen grid to provide the requisite low starting voltage. The regenerative effect of the increasing supply voltage across capacitor 34 during successive cycles of operation of the horizontal deflection system will allow horizontal output tube 30 to reach full conductivity after several cycles of operation of the tube.

It should further be noted that zener diode 36 can perform the dual functions of rectification and regulation to provide regulated direct current operating voltage at low power to a solid state circuit as well as a tube-type circuit such as that shown in the FIGURE. The teaching of this disclosure may be used in conjunction with any circuit in which current passed in the forward direction through a zener diode is utilized for normal operation of the circuit and the reverse breakdown characteristics of the zener serve to disable the rectifying function when the rectified voltage exceeds a predetermined level.

What is claimed is:

1. A high voltage protection system for controlling a generated high voltage supplied to a kinescope, comprising:

means for producing a viewable display on said kinescope including a controlled current conducting device having at least a first control electrode;

means coupled to said means for producing a viewable display for having alternating current voltage variations excited therein in response to the conduction of said controlled current conducting device, said voltage variations determining said generated high voltage; and means, including a rectifying and regulating device and filtering and storage means, coupled to said means for having voltage variations excited therein and to said first control electrode of said controlled current conducting device, for rectifying an alternating current voltage derived from said means for having voltage variations excited therein when said rectifying and regulating device is forward biased and for filtering and storing said rectified voltage for providing direct current voltage to said first control electrode which provides for conduction of said controlled current conducting device, said rectifying and regulating device conducting in a reverse direction when the difference between said stored voltage and said alternating current voltage exceeds a predetermined value for regulating said direct current voltage supplied to said control electrode of said controlled current conducting device for controlling said generated high voltage.

2. A high voltage protection system according to claim 1 wherein said controllable current conducting device is an electron tube.

3. A high voltage protection system according to claim 2 wherein said first control electrode is the screen grid of said tube.

4. A high voltage protection system according to claim 1 wherein said means for producing a viewable display is a horizontal deflection output amplifier.

5. A high voltage protection system according to claim 1 wherein said rectifying and regulating device is a zener diode.

6. A high voltage protection system for controlling a high voltage supply to a kinescope, comprising:

a deflection generator including a controlled current conducting device having at least a first control electrode;

means coupled to said deflection generator for having voltage variations induced therein in response to current flow in said deflection generator, said voltage variations being suitable for generating said high voltage;

a deflection winding disposed about said kinescope and coupled to said means for having voltage variations generated therein for having deflection current generated therein in response to said voltage variations; and means, including a rectifying and regulating device and filtering and storage means, coupled to said deflection generator and to said means for having voltage variations generated therein, for rectifying an alternating current voltage derived from said means for having voltage variations generated therein when said rectifying and regulating device is forward biased and for filtering and storing said rectified voltage thus providing direct current voltage to said first control electrode which provides for conduction of said controlled current conducting device and for regulating said direct current voltage at a predetermined value by the reverse conduction of said rectifying and regulating device, and for supplying said regulated direct current voltage to said first control electrode of said controlled current conducting device, said current flow in said deflection generator for controlling said generated voltage variations and said generated high voltage thereby being limited.

7. A high voltage protection system according to claim 6 wherein said controlled current conducting device is an electron tube.

8. A high voltage protection circuit according to claim 7 wherein said first control electrode is a screen grid of said electron tube.

9. A high voltage protection circuit according to claim 6 wherein said rectifying and regulating device is a zener diode.

10. A high voltage protection system for controlling a high voltage supply to a kinescope, comprising:

a transformer for having voltage variations generated therein, said voltage variations for generating said high voltage;

a deflection winding coupled to said transformer for having deflection current generated therein in response to said voltage variations in said transformer;

a deflection generator coupled to said transformer and to said deflection winding for generating said voltage variations in said transformer, said deflection generator including a controlled current conducting device having at least a first control electrode; and means, including a zener diode and capacitance means, coupled to said deflection generator and to said transformer for rectifying an alternating current voltage derived from said transformer when said zener diode is forward biased and for filtering and storing said rectified voltage thus providing direct current voltage to said first control electrode which provides for conduction of said controlled current conducting device and for regulating said voltage at a predetermined value by the reverse conduction of said zener diode, and for supplying said regulated direct current voltage to said first control electrode of said controlled current conducting device, said current flow in said deflection generator for controlling said generated voltage variations and said generated high voltage thereby being limited.

* * * * *